(12) United States Patent
Henry

(10) Patent No.: US 9,591,799 B2
(45) Date of Patent: Mar. 14, 2017

(54) METERING OF PRODUCT IN AN AIR CART ON HILLY TERRAIN

(71) Applicant: CNH America LLC, New Holland, PA (US)

(72) Inventor: James W. Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 443 days.

(21) Appl. No.: 13/750,439

(22) Filed: Jan. 25, 2013

(65) Prior Publication Data

US 2014/0209000 A1     Jul. 31, 2014

(51) Int. Cl.
| | | |
|---|---|---|
| A01C 7/04 | (2006.01) | |
| A01C 14/00 | (2006.01) | |
| A01B 79/00 | (2006.01) | |
| A01C 7/10 | (2006.01) | |
| A01C 7/08 | (2006.01) | |

(52) U.S. Cl.
CPC ............ *A01C 7/042* (2013.01); *A01B 79/005* (2013.01); *A01C 7/102* (2013.01); *A01C 14/00* (2013.01); *A01C 7/081* (2013.01)

(58) Field of Classification Search
USPC .... 111/15–18, 174, 176–178, 200, 900, 903; 701/1, 36, 49, 50
See application file for complete search history.

(56) References Cited

U.S. PATENT DOCUMENTS

| | | | |
|---|---|---|---|
| 4,023,707 A * | 5/1977 | Johnson | ............................ 222/1 |
| 4,254,897 A | 3/1981 | Stocks | |
| 4,646,941 A | 3/1987 | Grosse-Scharmann et al. | |
| 4,896,615 A * | 1/1990 | Hood et al. | .................... 111/177 |
| 5,325,800 A | 7/1994 | Wisor et al. | |
| 5,361,712 A * | 11/1994 | Townsend | .............. A01C 7/008 111/154 |
| 5,684,476 A * | 11/1997 | Anderson | ...................... 340/988 |
| 6,553,299 B1 * | 4/2003 | Keller et al. | .................... 701/50 |
| 6,581,535 B2 | 6/2003 | Barry et al. | |
| 6,640,733 B2 | 11/2003 | Huffmeyer | |
| 7,395,769 B2 | 7/2008 | Jensen | |
| 8,078,367 B2 * | 12/2011 | Sauder et al. | .................. 701/50 |
| 2010/0307394 A1 * | 12/2010 | Snipes et al. | ................... 111/11 |
| 2010/0307395 A1 * | 12/2010 | Snipes | ........................... 111/11 |

FOREIGN PATENT DOCUMENTS

| | | |
|---|---|---|
| DE | 3438011 A1 | 4/1986 |
| DE | 100 28 967 A1 | 12/2001 |
| EP | 0 597 196 A1 | 8/1993 |
| EP | 1 832 153 A1 | 3/2007 |

* cited by examiner

*Primary Examiner* — Alicia Torres
(74) *Attorney, Agent, or Firm* — Rebecca L. Henkel; Rickard K. DeMille

(57) ABSTRACT

An air cart for use in an agricultural air seeding system includes at least one tank for holding a material, and a metering system associated with the at least one tank. The metering system is configured for metering the material from the at least one tank at an output rate. A sensor senses a parameter associated with an angular orientation of the air cart relative to a reference plane, and provides an output signal indicative of the angular orientation. An actuator adjusts an output rate of the metering system. A controller is coupled with each of the actuator and the sensor and receives the output signal from the sensor. The controller is configured for controlling the actuator and thereby adjusting the output rate of the metering system, dependent upon the output signal.

6 Claims, 4 Drawing Sheets

METERING OF PRODUCT IN AN AIR CART ON HILLY TERRAIN

BACKGROUND OF THE INVENTION

1. Field of the Invention

The present invention relates to agricultural air seeders, and, more particularly, metering systems used in air carts for metering granular material to be applied to a field.

2. Description of the Related Art

Air seeders are commonly towed by a traction unit, e.g., an agricultural tractor, to apply a product or material such as seed, fertilizer and/or herbicide to a field. An air seeder has as a primary component a wheeled air cart which includes one or more frame-mounted tanks for holding material. In the case of multiple tanks, the tanks can be separate tanks, or a single tank with internal compartments. The air cart is typically towed in combination with a tilling implement, such as an air drill, one behind the other, to place the seed and fertilizer under the surface of the soil. Air seeders generally include a metering system for dispensing material from the tanks and a pneumatic distribution system for delivering the material from the tanks to the soil. A centrifugal fan provides at least one airstream which flows through the pneumatic distribution system. Material is first introduced to the air stream by the metering system at a primary distribution manifold located below the metering system. The tanks are formed with bottom surfaces that slope downward at an angle of repose for the granular material toward the metering system. Gravity, in combination with the vibrations and movement of the air cart, act to move the granular material from the perimeter of the tank toward the metering system located at the center of the tank. Material is carried by the air stream through distribution lines to a series of secondary distribution manifolds, which in turn distribute the material through distribution lines to seed boots mounted behind ground openers on the tilling implement so that the product may be evenly delivered to the ground which is tilled by the tilling implement.

Metering systems are known for their accuracy on level ground, but become inaccurate when operating over hilly terrain. Metering systems can generally handle an elevation change along the metering length (angle change to the meter axis) but become inaccurate front to back (90° to the meter axis). For example, it is known that a 15° slope on hilly terrain can cause a variation in the output rate of product from the metering system of +/−8%. This inaccuracy is due to the change of the bottom meter plate relative to the exit point of the product below the meter roller. The same type of inaccuracy also occurs with metering systems that utilize an auger rather than a roller.

What is needed in the art is an air cart which maintains an accurate output rate of product from the metering system, regardless of the slope of hilly terrain over which the air cart may be operating.

SUMMARY OF THE INVENTION

The present invention provides an air cart which controls an output rate of a metering system, dependent upon a sensed parameter associated with an angular orientation of the air cart (such as on hilly terrain, etc.).

The invention in one form is directed to an air cart for use in an agricultural air seeding system, including at least one tank for holding a material, and a metering system associated with the at least one tank. The metering system is configured for metering the material from the at least one tank at an output rate. A sensor senses a parameter associated with an angular orientation of the air cart relative to a reference plane, and provides an output signal indicative of the angular orientation. An actuator adjusts an output rate of the metering system. A controller is coupled with each of the actuator and the sensor and receives the output signal from the sensor. The controller is configured for controlling the actuator and thereby adjusting the output rate of the metering system, dependent upon the output signal.

The invention in another form is directed to a metering control system for use in an agricultural air cart. The metering control system includes a sensor, an actuator and a controller. The sensor senses a parameter associated with an angular orientation of the air cart relative to a reference plane, and provides an output signal indicative of the angular orientation. The actuator adjusts an output rate of the metering system. The controller is coupled with the actuator and the sensor and receives the output signal from the sensor. The controller is configured for controlling the actuator and thereby adjusting the output rate of the metering system, dependent upon the output signal.

The invention in yet another form is directed a method of controlling an output rate of a metering system for a granular material in an agricultural air cart. The method includes the steps of: sensing a parameter associated with an angular orientation of the air cart relative to a reference plane; and controlling an actuator to adjust an output rate of the metering system, dependent upon the sensed parameter.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
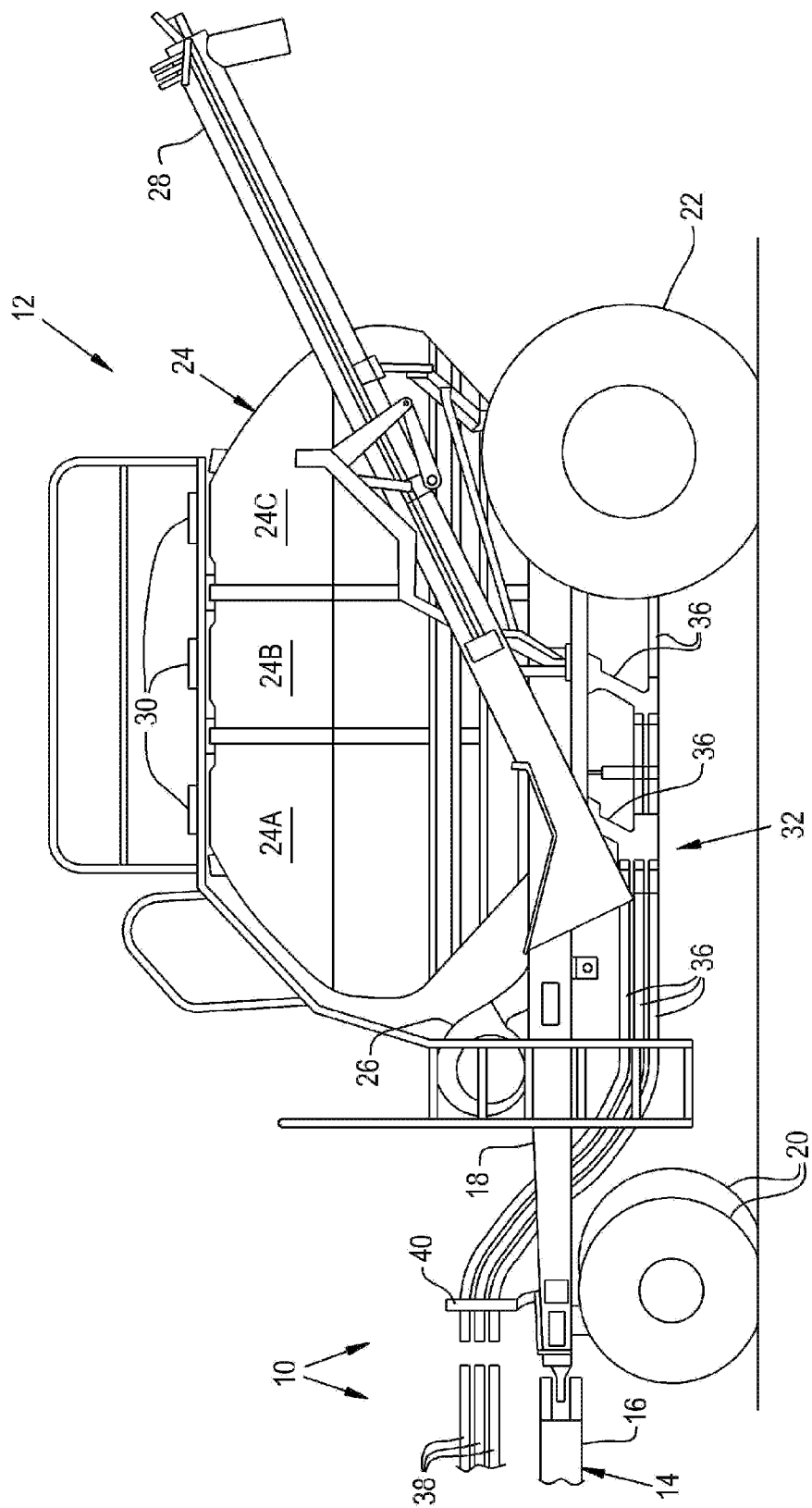
FIG. 1 is a partial, side schematic illustration of an embodiment of an air cart of the present invention.

Referring now to the drawings, and more particularly to FIG. 1, there is shown a partial, side schematic illustration of an embodiment of an air seeder 10 of the present invention. Air seeder 10 generally includes an air cart 12 which is towed by a tilling implement 14 (with only a portion of the rear hitch 16 of tilling implement 14 showing in FIG. 1). In the embodiment shown, tilling implement 14 is in the form of an air drill, but can be differently configured, depending upon the application. Air cart 12 may also be configured with a rear hitch (not shown) allowing air cart 12 to be towed in front of, rather than behind, tilling implement 14.

Air cart 12 generally includes a frame 18 which carries steerable front wheels 20, rear wheels 22, tank 24, blower 26 and auger 28. Tank 24 is illustrated as a multi-compartment tank with internal divider walls (not shown) separating the compartments. In the embodiment shown, tank 24 has three compartments 24A, 24B and 24C with each compartment containing a material to be deposited into the soil (such as seed, fertilizer, herbicide and/or insecticide). Each compartment 24A, 24B and 24C has a top hatch 30 allowing loading of the material therein.

Air cart 12 includes a pneumatic distribution system 32 for delivering the air-entrained material to the trenches in the soil formed by tilling implement 14. Pneumatic distribution system 32 includes a metering system (not specifically shown in FIG. 1), blower 26 and a plurality of air lines 36. Air lines 36 extend to and terminate at a convenient location for coupling with air lines 38 associated with tilling implement 14. Air lines 36 are supported at the forward end of air cart 12 with a support yoke 40. In the illustrated embodiment, blower 26 is a centrifugal blower, but can be differently configured. Further, in the illustrated embodiment, three primary air lines 36 are shown, one from each tank compartment 24A, 24B and 24C. However, the number of air lines 36 can vary, depending on the application.

Figure 2:
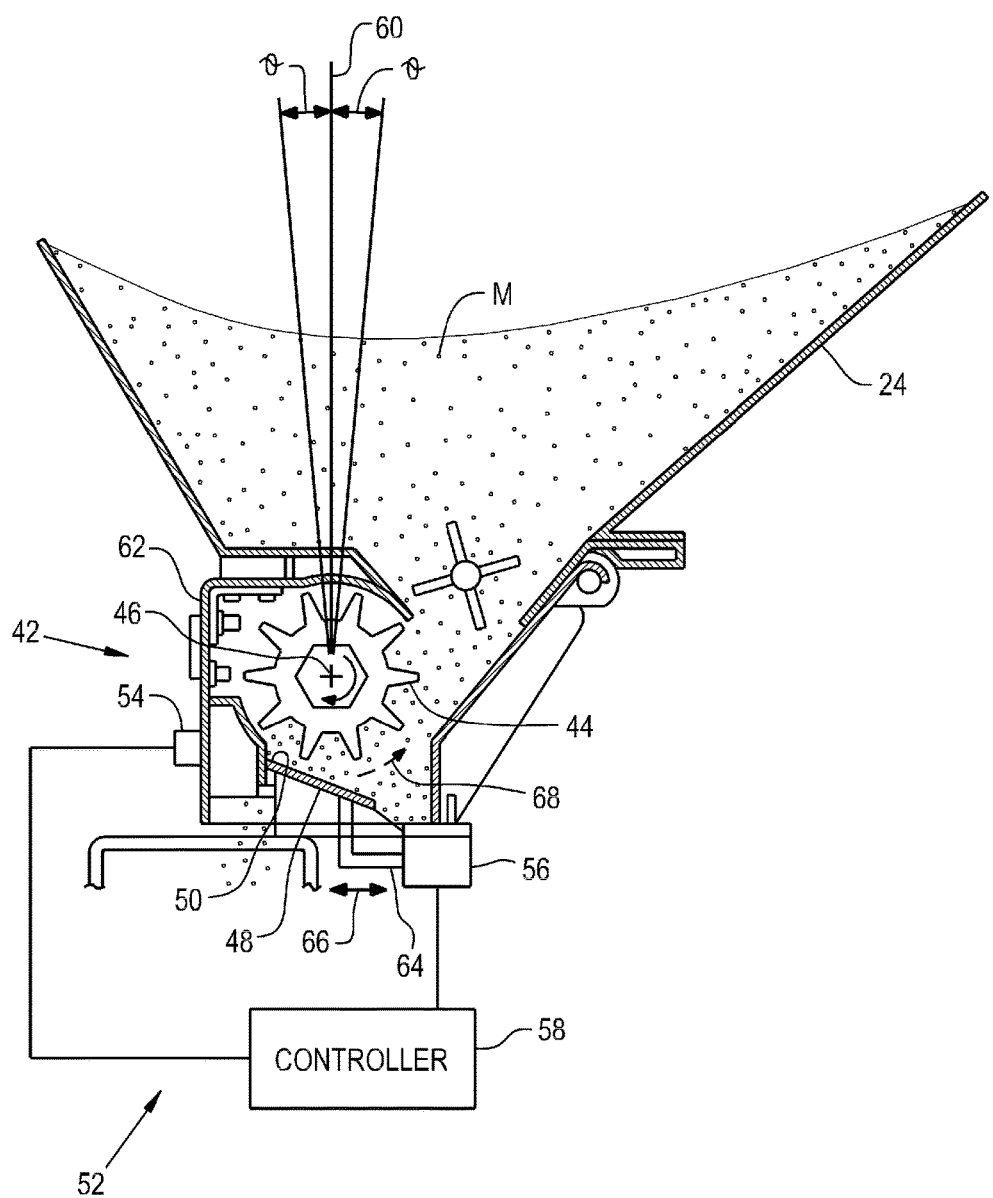
FIG. 2 is a schematic illustration of an embodiment of a metering control system of the present invention.

Referring now to FIG. 2, tank 24 is positioned above and connected with a metering system 42 which is configured for metering a granular material M from tank 24 at an output rate. Metering system 42 includes a rotatable metering element 44 which rotates at a controlled rotational speed about an axis of rotation 46. In the embodiment shown, rotatable metering element 44 is in the form of a metering roller, but could also be configured as an auger for specific applications. Metering roller 44 rotates about axis of rotation 46 in a clockwise direction as shown in FIG. 2, as indicated by the curved directional arrow. A plate 48 is positioned below metering roller 44 at a predetermined spacing and orientation. Plate 48 has a trailing edge 50 from which the granular material falls for entrainment within the airflow from blower 26. Plate 48 is shown as a generally flat plate, but could also be curved for specific applications.

Metering control system 52 includes a sensor 54, actuator 56 and controller 58. Sensor 54 senses a parameter associated with an angular orientation θ of air cart 12 relative to a reference plane 60, and provides an output signal indicative of the angular orientation. In the illustrated embodiment, reference plane 60 is a generally vertical plane which extends through axis of rotation 46, perpendicular to the drawing. The angular orientation θ corresponds to the orientation of air cart 12 on sloped or hilly terrain. As indicated above, a 15° slope on hilly terrain can cause a variation in the output rate of product from the metering system of +/−8%.

Sensor 54 is configured as an inclinometer in the embodiment shown in FIG. 2 and is attached to a generally vertical wall 62. Vertical wall 62 is generally parallel to the generally vertical reference plane 60; thus, any tipping of vertical wall 62 caused by hilly terrain likewise causes and output signal from sensor 54 which is indicative of the angular orientation of air cart 12 relative to vertical reference plane 60.

Actuator 56 is connected with plate 48, and adjusts the output rate of metering system 42 by controlling the position of plate 48. More particularly, actuator 56 is assumed to be an electric linear actuator in the embodiment of FIG. 2, with an output shaft 64 which is selectively movable in opposite directions, as indicated by double headed arrow 66. Output shaft 64 is connected at its distal end with plate 48 and likewise moves plate 48 in opposite directions parallel to the movement of output shaft 64. Moving the trailing edge 50 of plate 48 controls the amount of granular material which falls over trailing edge 50, and thereby controls the output rate of metering system 42. Actuator 56 can be configured as a different type of actuator, such as a fluid actuated cylinder with a piston rod extending from the cylinder.

Controller 58 is coupled with each of actuator 56 and sensor 54 and receives the output signal(s) from sensor 54. Controller 58 controls actuator 56 to thereby adjust the output rate of metering system 42, dependent upon the value of the output signal corresponding to the angular orientation θ of air cart 12.

As described above, actuator 56 moves plate 48 in generally opposite linear directions 66. However, it may also be desirable to configure actuator 56 to move plate 48 in a curved travel path along a radius of curvature about axis of rotation 46, as indicated by curved dashed arrow 68. This would have the effect of maintaining trailing edge 50 of plate 48 at the same position relative to metering roller 44, regardless of any tipping of tank 24 and metering system 42 relative to vertical reference plane 60.

Figure 3:
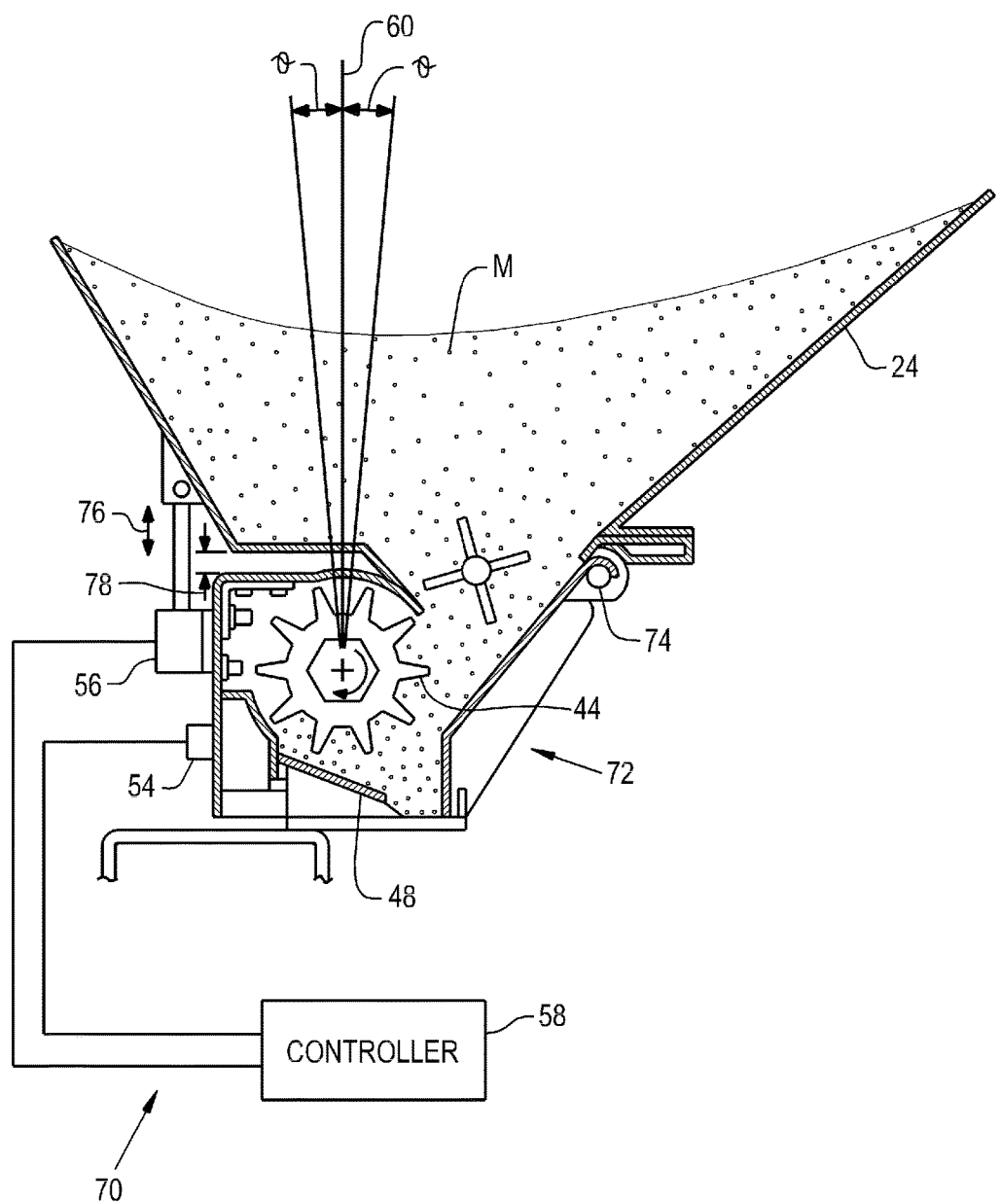
FIG. 3 is a schematic illustration of another embodiment of a metering control system of the present invention.

Referring now to FIG. 3, there is shown another embodiment of a metering control system 70 of the present invention. Metering control system 70 is similar to metering control system 52 in the sense that it controls an output rate of metering system 72, dependent upon a sensed parameter associated with an angular orientation of air cart 12. However, metering control system 70 controls the output rate of metering system 72 in a different manner.

More particularly, metering system 72 is pivotally coupled with tank 24 at a pivot rod 74. Plate 48 is at a fixed position below and relative to metering roller 44. An actuator 56 is interconnected between tank 24 and metering system 72, and is movable in opposite axial directions as shown by double headed arrow 76. Controller 58 receives an output signal from sensor 54 indicative of an angular orientation θ of metering system 72, and controls actuator 56 to move metering system 72 toward and away from tank 24, as indicated by the adjustable spacing 78.

Figure 4:
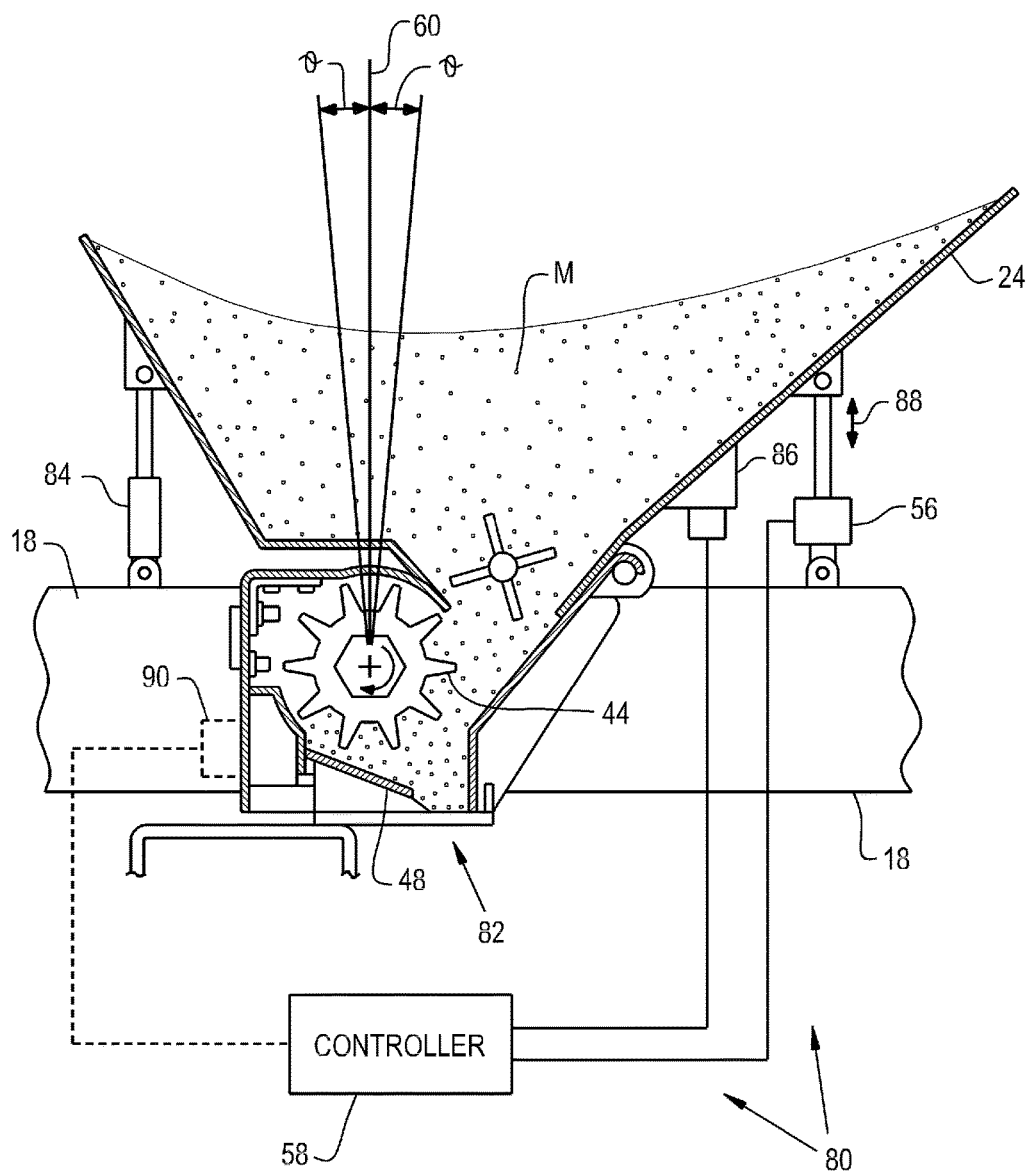
FIG. 4 is a schematic illustration of yet another embodiment of a metering control system of the present invention.

Referring now to FIG. 4, there is shown yet another embodiment of a metering control system 80 of the present invention. In this embodiment, a metering system 82 is coupled with and immovable relative to tank 24. Tank 24 is carried by and movable relative to frame 18 of air cart 12. A shock absorber 84 (or more than one shock absorber) interconnects one side of tank 24 with frame 18, and an actuator 56 (or more than one actuator) interconnects an opposite side of tank 24 with frame 18. Plate 48 is at a fixed position below and relative to metering roller 44. Sensor 86 is in the form of a weight sensor associated with tank 24. Dependent upon the angular orientation of tank 24, the force vectors of the weight applied to weight sensor 86 will vary, which in turn correlates to an angular orientation θ of air cart 12 relative to the vertical reference plane 60. Controller 58 receives an output signal from sensor 86 indicative of an angular orientation of tank 24 and metering system 82, and controls actuator 56 to move tank 24 toward and away from frame 18, as indicated by the double headed arrow 88. Rather than using a weight sensor 86, metering control system 80 may optionally use a sensor in the form of an inclinometer 90 (shown in dashed lines) which provides an output signal to controller 58 corresponding to an angular orientation of metering system 82.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An air cart for use in an agricultural air seeding system, comprising:
   at least one tank for holding a material;
   a metering system associated with said at least one tank, said metering system being configured for metering said material from said at least one tank at an output rate and including:
      a rotating metering element connected to said at least one tank and rotating in a given direction, said rotatable metering element having an axis of rotation and being bisected by a generally vertical reference plane extending through said axis of rotation;
      a vertical wall moveable with respect to the reference plane; and
      a plate positioned below said rotatable metering element and having a trailing edge relative to the direction of rotation of said rotating metering element;
   a sensor operatively connected to the vertical wall for sensing a parameter associated with an angular orientation of said vertical wall relative to the reference plane, said sensor providing an output signal indicative of said angular orientation;
   an actuator for adjusting said output rate of said metering system by displacing said trailing edge; and
   a controller coupled with each of said actuator and said sensor and receiving said output signal from said sensor, said controller being configured for controlling said actuator and thereby adjusting said output rate of said metering system, dependent upon said output signal.

2. The air cart of claim 1, wherein said sensor senses an angular orientation associated with said at least one tank relative to said reference plane.

3. The air cart of claim 1, wherein said sensor is an inclinometer.

4. The air cart of claim 1, wherein said actuator is coupled with and controllably moves said plate.

5. The air cart of claim 4, wherein said rotatable metering element comprises one of a roller and an auger.

6. The air cart of claim 5, wherein said actuator controllably moves said plate along a radius of curvature about said axis of rotation.

* * * * *